A. SHERER.
PROCESS OF COOKING COFFEE AND CHICORY.
APPLICATION FILED OCT. 26, 1912.
1,179,046.
Patented Apr. 11, 1916.
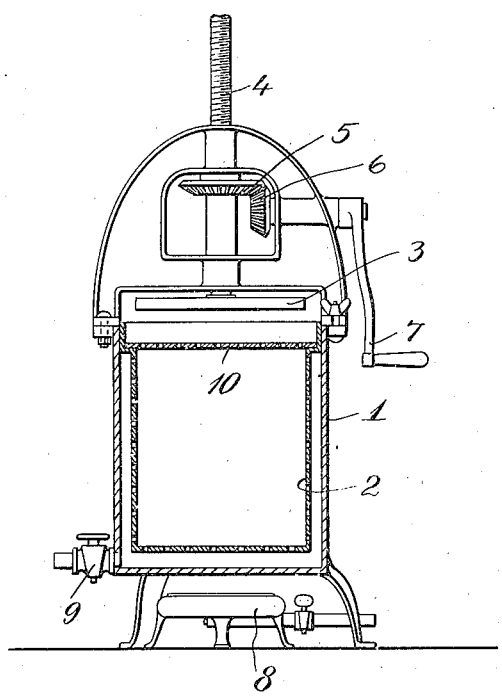

UNITED STATES PATENT OFFICE.

ADOLPH SHERER, OF NEW YORK, N. Y.

PROCESS OF COOKING COFFEE AND CHICORY.

1,179,046.   Specification of Letters Patent.   Patented Apr. 11, 1916.

Application filed October 26, 1912. Serial No. 727,959.

*To all whom it may concern:*

Be it known that I, ADOLPH SHERER, a citizen of the United States, and a resident of the city of New York, borough of Brooklyn, county of Kings, and State of New York, have invented certain new and useful Improvements in Processes of Cooking Coffee and Chicory, of which the following is a specification.

This invention relates to the cooking, commonly termed "roasting", of coffee and chicory. According to the present process I accomplish this cooking by immersing the coffee and chicory in oil or fat heated to a suitable temperature.

It is well known that the ordinary process of roasting or cooking coffee and chicory involves the heating of the coffee or chicory by direct contact with hot air or products of combustion, the chicory and coffee being exposed to the air during such treatment. As a result, a good deal of the aroma is lost and the coffee and chicory is apt to acquire a smoky taste, and furthermore cinders are frequently mixed with it. The browning of the coffee and chicory when cooked by the ordinary process, is often imperfect, and cooking is often ununiform, portions of the coffee and chicory being over-cooked and other portions under-cooked.

I have found that by the process herein described, the cooking is very uniform and may be carried to precisely the degree desired. Since the coffee and chicory are not exposed to the air during treatment, nor to contact with flame or furnace gases, the aroma is not lost and a coffee or chicory of very high grade may be produced.

The process may be carried on in various forms of apparatus.

In the accompanying drawing I show in central vertical section, one form of apparatus which may be employed.

In said drawing, 1 designates a suitable kettle, having within it a perforate cylinder 2, the bottom as well as the sides of which are perforated.

3 designates a suitable press plunger mounted upon a screw 4, which screw is adapted to be rotated by means of bevel gears 5 and 6, and a crank 7. Beneath the kettle there is a gas burner 8. A suitable draw-off connection 9 is provided.

My process is carried out as follows: The kettle 1 is filled to about three quarters of its capacity with a suitable oil or grease (I have found cotton seed oil, and the commercial hydrogenated oil product known as "crisco", to be suitable, though I do not limit myself to the use of these oils only), and this oil or grease is brought to a temperature in excess, preferably, of 300° Fahrenheit. The perforate cylinder 2, filled to about half its capacity with kiln dried chicory root cuts, or with coffee beans, is then placed within the kettle, a perforate cover 10 being placed within the screen cylinder 2 to hold the chicory or coffee completely submerged in the hot oil or melted grease. This hot oil or melted grease communicates heat very uniformly to the coffee or chicory with the result that the heat treatment of the coffee or chicory is conducted very uniformly.

The time of treatment depends upon the temperature of oil or melted grease, and the extent to which it is desired to cook the coffee or chicory root cuts. Chicory root cuts containing only a small proportion of moisture can be cooked as described, in oil or melted grease of from 300 to 350° in from fifteen to twenty minutes; though if the content of moisture be higher the temperature of oil or melted grease may be from 350 to 380°, the time required for the treatment being about the same. In the case of coffee, I prefer to have the oil or melted grease at a temperature of from 350 to 450° Fahrenheit.

When the coffee or chicory is cooked to the proper degree, the oil or melted grease is drawn off from the draw-off connection 9, and then, in the case of chicory, surplus oil or melted grease is pressed out of the chicory by forcing the plunger or piston 3 down, the perforate cover 10 being first removed. In the case of the treatment of coffee, I do not attempt to press the excess oil or melted grease out of the coffee, but drain the coffee thoroughly, and then remove remaining excess grease or oil from the coffee beans by "milling," *i. e.*, wiping with a suitable absorbent material, such for example as felt.

I have found that suitable oils or greases, such as cotton seed oil and crisco, do not penetrate materially into the chicory or coffee during the treatment as described, to an extent sufficient to injuriously affect the product. In the case of coffee, the very thin layer of oil or grease remaining on the coffee bean, after melting, is advantageous, since it serves to prevent the entrance of moisture into the coffee bean, and so prevents deterioration of the product by absorption of moisture, as occurs with coffee roasted in the ordinary manner.

There being no opportunity for admixture of cinders, ashes and char, with the product, by the process herein described, the product is in no wise impaired by mixture with such substances, as usually occurs in the case of coffee and chicory cooked by ordinary processes.

A further advantage of the process as above described, is that the time of treatment is greatly reduced, as compared with the time required for roasting coffee and chicory in the ordinary manner. About an hour and a half is usually required for roasting chicory in the ordinary manner, whereas the time required by my process is, as above stated, from fifteen to twenty minutes. A similar reduction in time is experienced in the treatment of coffee.

Instead of removing surplus oil from the coffee beans by milling, as above described, I may remove such surplus oil by mixing the coffee beans with a pulverulent dry absorbent material, such for example as bran, or hominy or other cereal substance. An ordinary tumbling barrel is convenient apparatus for use in such cases.

What I claim is:—

1. The herein described process of cooking coffee and chicory which consists in immersing the same in oil heated to a temperature between 300° and 450° F.

2. The herein described process of cooking coffee and chicory which consists in immersing the same in oil heated to a temperature between 300° and 450° F. and then removing the excess of oil from the cooked material.

3. The herein described process of cooking coffee and chicory which consists in immersing the same in a suitable oil heated to a temperature between 300° and 450° F., maintaining the oil at such temperature until a uniform and complete cooking has been effected, removing the cooked material from the oil, and separating therefrom any excess oil.

4. The herein described process of cooking coffee and chicory which consists in immersing the same in a hydrogenated oil heated to a temperature between 300° and 450° F., maintaining the oil at such temperature until a uniform and complete cooking has been effected, removing the cooked material from the oil, and separating therefrom any excess oil.

In testimony whereof I have signed this specification in the presence of two subscribing witnesses.

ADOLPH SHERER.

Witnesses:
H. M. MARBLE,
D. A. DAVIES.